(12) United States Patent
Sauler et al.

(10) Patent No.: US 6,912,460 B2
(45) Date of Patent: Jun. 28, 2005

(54) METHOD FOR DETECTING KNOCK IN AN INTERNAL COMBUSTION ENGINE

(75) Inventors: Juergen Sauler, Stuttgart (DE); Oskar Torno, Schwieberdingen (DE); Axel Heinstein, Wimsheim (DE); Carsten Kluth, Stuttgart (DE); Werner Haeming, Neudenau (DE)

(73) Assignee: Robert Bosch GmbH, Stuttgart (DE)

( * ) Notice: Subject to any disclaimer, the term of this patent is extended or adjusted under 35 U.S.C. 154(b) by 139 days.

(21) Appl. No.: 09/933,092

(22) Filed: Aug. 20, 2001

(65) Prior Publication Data

US 2002/0029105 A1 Mar. 7, 2002

(30) Foreign Application Priority Data

Sep. 1, 2000 (DE) ........................ 100 43 498

(51) Int. Cl.[7] .............................................. G06F 19/00
(52) U.S. Cl. ...................... 701/114; 701/111; 73/35.01; 73/35.03; 73/35.04; 73/35.05; 123/406.16; 123/406.21; 123/406.34; 123/406.39
(58) Field of Search ............................ 73/35.03, 35.04, 73/35.05, 35.01; 123/406.34, 406.35, 406.16, 406.21, 406.29, 406.37, 406.38, 406.39; 701/111

(56) References Cited

U.S. PATENT DOCUMENTS

| | | | | |
|---|---|---|---|---|
| 4,711,213 A | * | 12/1987 | Sakakibara et al. .... | 123/406.35 |
| 5,101,790 A | * | 4/1992 | Takasu et al. .......... | 123/406.38 |
| 5,517,969 A | | 5/1996 | Unland et al. .......... | 123/425 |
| 5,743,233 A | | 4/1998 | Unland et al. .......... | 123/425 |
| 6,279,536 B1 | | 8/2001 | Brielbeck et al. ...... | 123/406.35 |
| 6,311,671 B1 | * | 11/2001 | Torno et al. ........... | 123/406.29 |
| 6,456,927 B1 | * | 9/2002 | Frankowski et al. ..... | 701/111 |
| 6,520,149 B2 | * | 2/2003 | Kokubo et al. ......... | 123/406.37 |
| 6,727,812 B2 | * | 4/2004 | Sauler et al. ............ | 340/511 |

FOREIGN PATENT DOCUMENTS

| | | |
|---|---|---|
| DE | 43 33 965 A1 | 4/1995 |
| DE | 195 06 272 A1 | 8/1996 |

* cited by examiner

*Primary Examiner*—Tony M. Argenbright
*Assistant Examiner*—Johnny H. Hoang
(74) *Attorney, Agent, or Firm*—Michael J. Striker

(57) ABSTRACT

The method for knock detection includes establishing that knock is occurring in the internal combustion engine when the amplified knock signal exceeds a predetermined reference level in a predetermined manner. The reference level is determined on the basis of individual cylinders and the increase in the reference level is limited when a new reference level leaves a predetermined reference level range or the gradient of the sound increase exceeds a predetermined threshold value. For determination of the reference level range and/or the threshold for the gradient average values of the signals originating from the sound of other cylinders are considered.

11 Claims, 3 Drawing Sheets

METHOD FOR DETECTING KNOCK IN AN INTERNAL COMBUSTION ENGINE

BACKGROUND OF THE INVENTION

1. Field of the Invention

The present invention relates to a method for knock detection in an internal combustion engine and, more particularly, to a process of detecting knock in an internal combustion engine, in which the presence of knock is established, when the detected, if necessary amplified, knock sensor signal exceeds a reference level, which changes according to the noise or sound level of the operating internal combustion engine.

2. Description of the Related Art

Combustion events, which lead to knock, can occur in the cylinders of an internal combustion engine, during its operation. These combustion events, which can lead to destruction of the internal combustion engine, must be reliably detected, so that measures to prevent further knocking can be rapidly performed. Usually sensors are employed for knock detection, which are associated with the cylinders of the internal combustion engine and which supply a signal, which depends on the noise or sound level of the internal combustion engine and on the knock sounds occurring in it.

The output signals of the knock sensors are usually evaluated in a control unit of the internal combustion engine, which controls the ignition and/or injection according to the knock detection. The special problem with knock detection is that the knock sounds must be distinguished from a variety of other sounds, especially the basic sounds of internal combustion engine operation. It is thus known to perform a special evaluation process for knock detection. The basis for the usual knock detection is the formation of a reference level of the basic sounds from the internal combustion engine when it is operating without knocking or knock events. This reference level is determined from the output signals of the knock sensors for the individual cylinders by the control unit. This determination can occur in a cylinder-specific manner or as an average over the cylinders. The reference level is calculated during operation continually so that the actual conditions of the internal combustion engine are continually represented in it. A formula (1) for computation of the reference level is, for example, given by:

$$rkr(\text{new}) = rkr(\text{old}) \cdot [(KRFTP-1)/KRFTP] + ikr/KRFPT \quad (1)$$

wherein rkr(new) represents the new reference level;

rkr (old) represents the old reference level;

KRFTP represents a factor for tracking the reference level, a typical value for KRFTP being 16 in knock free operation; and ikr represents the integrated value of the actual combustion events, usually of the amplified knock signal in a predetermined range.

During rapid sound changes, for example because of rapid load or rotation speed changes, the tracking factor KRFTP is less than 16. In load or rotation speed changes the sound changes in all cylinders are similar. The reference level tracking occurs also in knocking operation by the above-mentioned formula. When no knocking combustion events are occurring, the actual integrated value is computed as described above. During knocking combustion the actual integrated value is not completely calculated, but is corrected prior to calculating. The ratio of the actual integrated value ikr to the reference level rkr is formed for actual knock detection. When this ratio exceeds a predetermined threshold value, it is established that knock is occurring. A device for knock detection using the above-described procedure is described, for example, in German Patent Document DE-OS 43 339 65 and/or U.S. Pat. No. 5,743,233, which belong to the same patent family.

SUMMARY OF THE INVENTION

The reference signal, which is formed from the output signals from the knock sensors, is influenced by several different factors, for example by undetected knocking combustion and by erroneous detection. These events can be caused, e.g. by interfering noise in the internal combustion engine and/or motor. The reference level increases strongly because of interfering noise or sound, which makes knock detection no longer possible. This is particularly the case when the sound or noise level causes a slow climb in the reference level. In this case a persistent or permanent knock can occur whereby the internal combustion engine and/or the motor is destroyed. Interfering sounds or noises can include both mechanical noises, for example due to valve closing and electrical coupling. These interfering sounds or noises are partially sporadic and occur only in a few cylinders. In this case only the reference level of the concerned cylinder is interfered with, while the reference level and thus the knock detection in the other cylinders is not effected.

Thus it is an object of the present invention to limit those interfering sounds or noises or to prevent the effects of these interfering sounds or noises, particularly to prevent knocking events from occurring without detection in any of the cylinders.

This object and others, which will be made more apparent hereinafter, are attained in a method of detecting knock in an internal combustion engine, in which knock is detected when the detected, if necessary amplified, knock sensor signal exceeds a reference level, which changes according to the noise or sound level of the internal combustion engine.

According to the invention increases in the reference level are limited in a predetermined manner considering a reference level range and/or considering a gradient, which is a measure of the change of the reference level.

The advantage of the invention is that reliable knock detection can even be performed when undetected knock combustion occurs in at least one of the cylinders, when erroneous detection of knocking occurs or when the noise or sound level is so great that it can lead to an impairment of the knock detection. In all these fault conditions a too great increase in the reference level due to an interfering signal, which would make knock detection impossible, is prevented. In an advantageous manner the reference level of the effected cylinder cannot increase impermissibly and thus reliable knock detection is possible. This advantage is especially effective when the noise or sound level only occurs in one or only a few cylinders and/or associated sensors.

This advantage is attained, since the increase of the reference level, which changes according to the sound or noise level of the internal combustion engine, is limited in a predetermined manner, especially considering the reference level range or a gradient, which is a measure of the change of the reference level. The establishment of a reference level range and/or the determination of a threshold value for a gradient that is still to be tolerated occur in an advantageous manner according to the sound or noise level of all cylinders or of one selected cylinder. Average value formation for establishment of a limiting value or threshold value is of special advantage.

The additional advantages of the invention are made more apparent by the subject matter of the appended dependent claims.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

The increase of the reference level rkr for an individual cylinder can be limited in the embodiment described in the following description. The reference level rkr(i) or the gradient for another cylinder is used as the limit or threshold for the increase in the reference level of the individual cylinder. Because of this feature the reference level of the cylinder that is effected cannot increase too much and knock detection in that cylinder is also possible. This is particularly effective, when the interfering sound or noise occurs in only a few cylinders.

The tracking of the reference level rkr(new)(i) is calculated for each cylinder individually, as it is currently done. In the embodiment shown in FIG. 1 the tracking of the reference level corresponds to the step SCH1. The reference level is calculated, according to eq. (1'), as follows $$rkr(\text{new})(i) = rkr(\text{old})(i) \cdot [(KRFTP-1)/KRFTP] + ikr(i)/KRFPT \quad (1')$$

wherein rkr(new)(i) represents the new reference level for the ith cylinder; rkr (old)(i) represents the old reference level for the ith cylinder; ikr (i) is the integration factor for the ith cylinder and KRFTP represents a factor for tracking the reference level.

Equation (1') corresponds to the already known state of the art. Subsequently the value determined is tested. Whether or not the reference level is in a predetermined range is tested. In the second embodiment shown in FIG. 2 whether or not the gradient, grad(i), of the noise or sound increase in the cylinder is higher than the predetermined value is tested. The reference level in the method according to the invention is limited according to these conditions.

Figure 1:
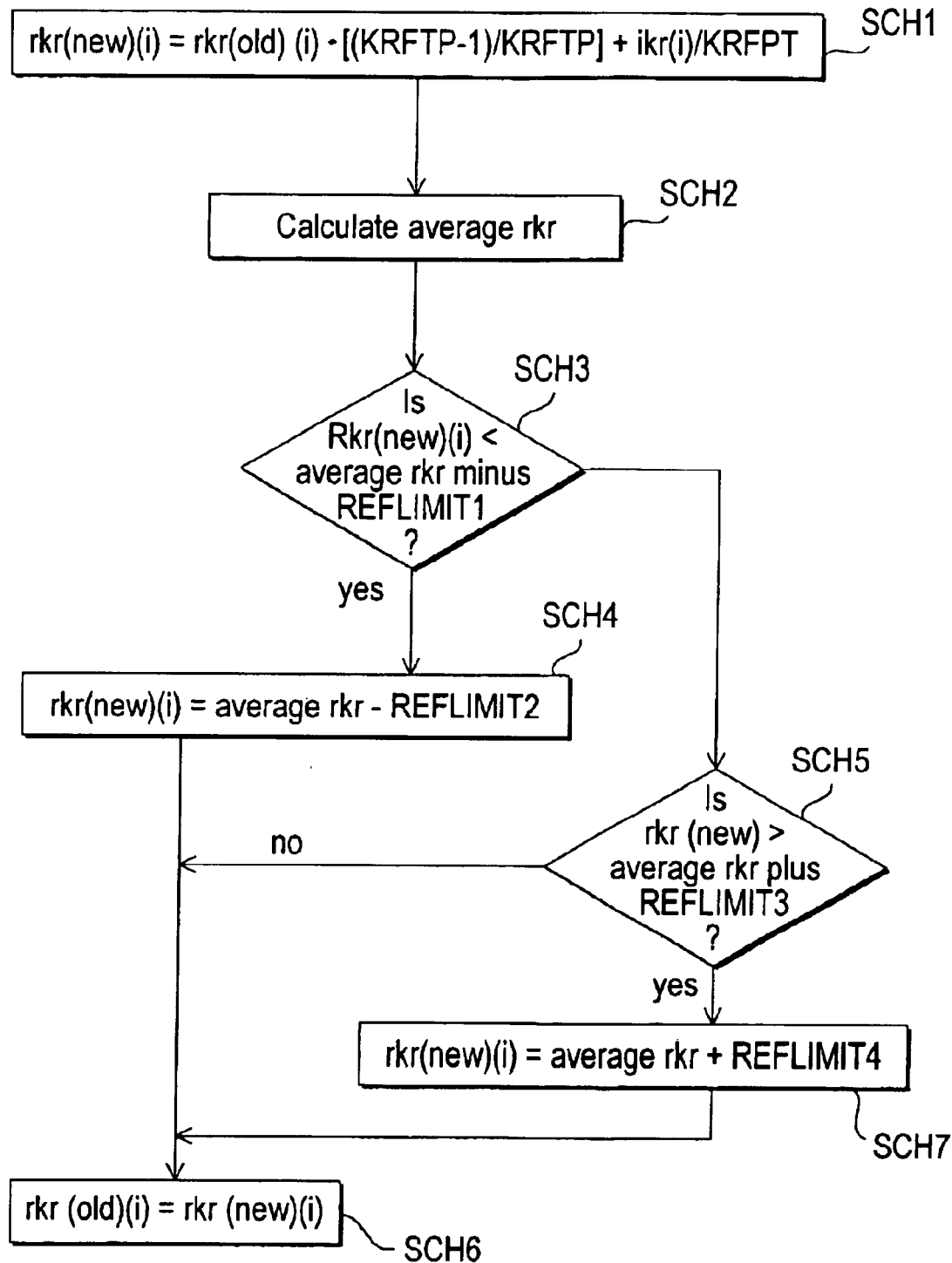
FIGS. 1 and 2 are respective flow charts for two preferred embodiments of the method for detection of knock in an internal combustion engine.

The range is determined, for example, from the average value of the reference level of all cylinders in the embodiment of FIG. 1 and its relationship to an applicable threshold REFLIMIT is maintained. The calculation of the average of the reference value takes place in step SCH2 of FIG. 1. The new reference value rkr(new)(i) is tested in step SCH3. Whether or not it is smaller than the average value of the reference level values, average rkr, minus the threshold REFLIMIT1 is tested in step SCH3. If the result of the test in step SCH3 shows that the condition for the new reference value is satisfied, in step SCH4 the new reference value, rkr(new)(i), takes the value average rkr minus the range REFLIMIT2. If, in contrast, the test in step SCH3 shows that the condition for the new reference value is not satisfied, namely that the rkr(new)(i) is greater than the average value rkr minus REFLIMIT1, whether or not the new reference value rkr(new)(i) is greater than the average rkr plus REFLIMIT3 is tested in the step SCH5. If the result of that comparison is that the condition in the step SCH5 is not fulfilled, the old reference level value rkr(old)(i) is replaced by the new reference level rkr(new)(i) in step SCH6.

If, in contrast, the comparison in step SCH5 shows that the new reference level rkr(new)(i) is greater than the average value of the reference levels plus the limit REFLIMIT3, the new reference level value rkr(new)(i) is replaced by the average value of the reference levels, average rkr, plus the limit REFLIMIT4 in step SCH7.

Figure 2:
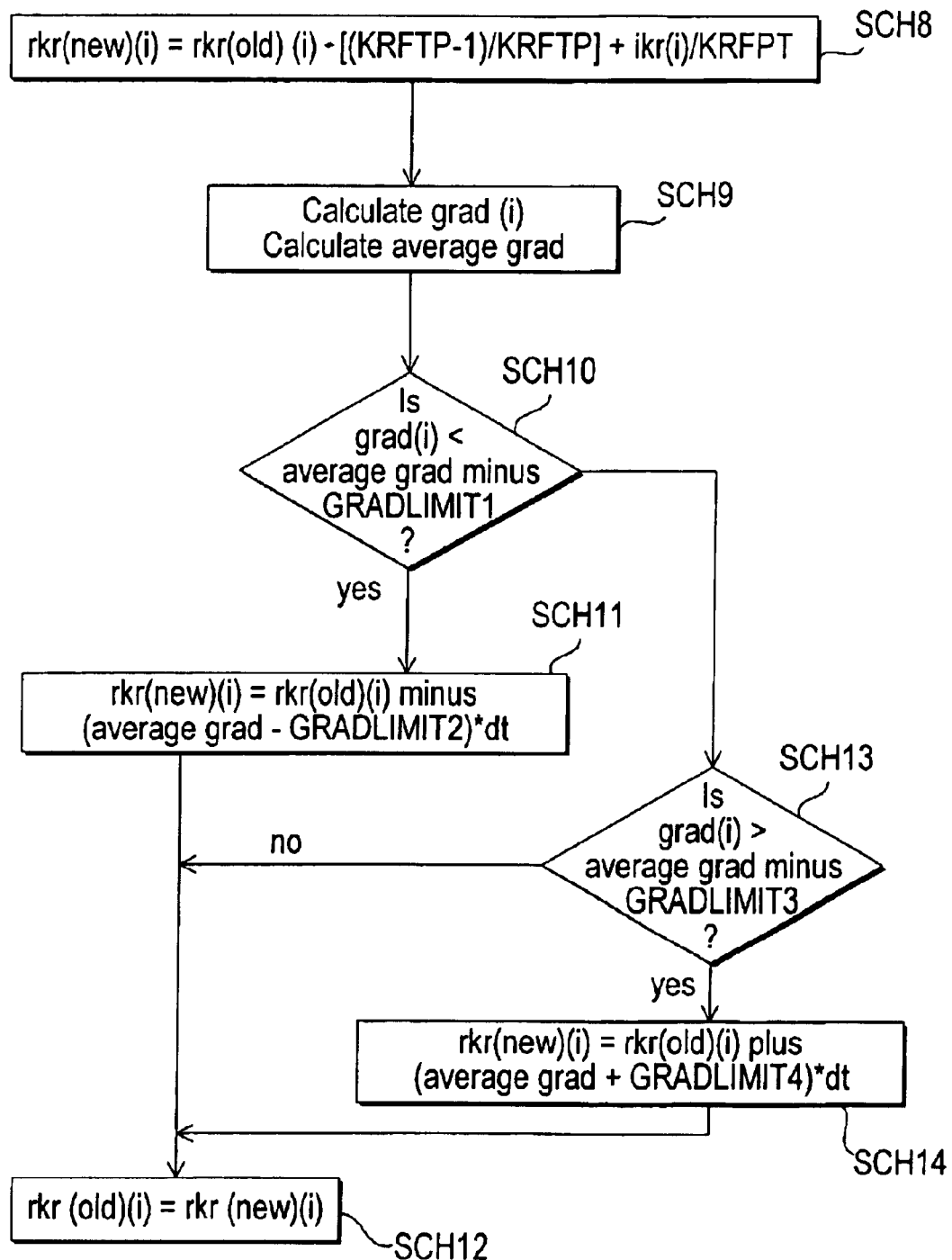

In FIG. 2 an additional embodiment of the invention is shown, in which the new reference level rkr(new)(i) is formed from the old reference level rkr(old)(i) by multiplying with the ratio [(KRFPT−1)/KRFPT] and adding the ratio ikr(i)/KRFPT in a first step SCH8, which corresponds to the first step SCH1 in the previous embodiment. In the step SCH9 the gradient is calculated from the reference level rkr(i). This calculation includes both the calculation of the gradient, grad (i), and also the calculation of the average value of the gradient, grad (i).

In the step SCH10 whether or not the gradient, grad(i), is less than the average value of the gradient values minus the gradient bounding or limiting value GRADLIMIT1 is tested. If this condition is fulfilled in step SCH10, the new reference value rkr(new)(i) is replaced by the old reference value rkr(old)(i) minus the product of a difference of the average value of the gradients and a further limiting condition GRADLIMIT2 multiplied by the time interval, dt. The result so obtained is taken as the new reference value in step SCH12, in which rkr(old)(i)=rkr(new)(i).

If the result of the comparison in step SCH10 is that the gradient, grad(i), is not less than the average value of the gradients minus a limiting value for the gradient GRADLIMIT1, whether or not the gradient, grad(i), is greater than the average value of the gradients minus the limiting value for the gradient GRADLIMIT3. When this condition is fulfilled, in the step SCH14 the new reference value rkr(new)(i) is equal to the old reference value rkr(old)(i), corrected with the sum of the average value of gradients and the limiting value of the gradient, GRADLIMIT4, this sum being multiplied by the time interval, dt. The limit of the reference level is thus again obtained in step SCH12.

Groups of cylinders can be formed for the calculation instead of using all cylinders. The basis for this group formation can be, for example, according to the loudness or softness of the individual cylinders as well as their associated with particular knock sensors. The methods shown in FIGS. 1 and 2 are based on all the cylinders without individual grouping. The methods are however equivalent when the cylinders are divided into groups.

The calculation of the new reference level in steps SCH11 and SCH14 can alternatively be based on average values of the reference levels, average rkr. In both steps the reference level rkr(old)(i) is replaced by the average value of the reference levels, average rkr, in that embodiment. For step 11, i.e. when the gradient, grad(i), is less than the threshold value, the following equation (2) results:

$$rkr(\text{new})(i) = \text{average } rkr - (\text{average grad} - GRADLIMIT2) \cdot dt + REFLIMIT2 \quad (2)$$

When the gradient, grad, is larger than the threshold value in step SCH10, the reference level in step SCH14 is calculated according to the following equation (3):

$$rkr(\text{new})(i) = \text{average } rkr - (\text{average grad} - GRADLIMIT4) \cdot dt + REFLIMIT4 \quad (3),$$

wherein average rkr is the average value of the reference levels in all cylinders, average grad is the average value of the gradients in all cylinders; and dt is the time interval required for the gradient calculation.

Figure 3:
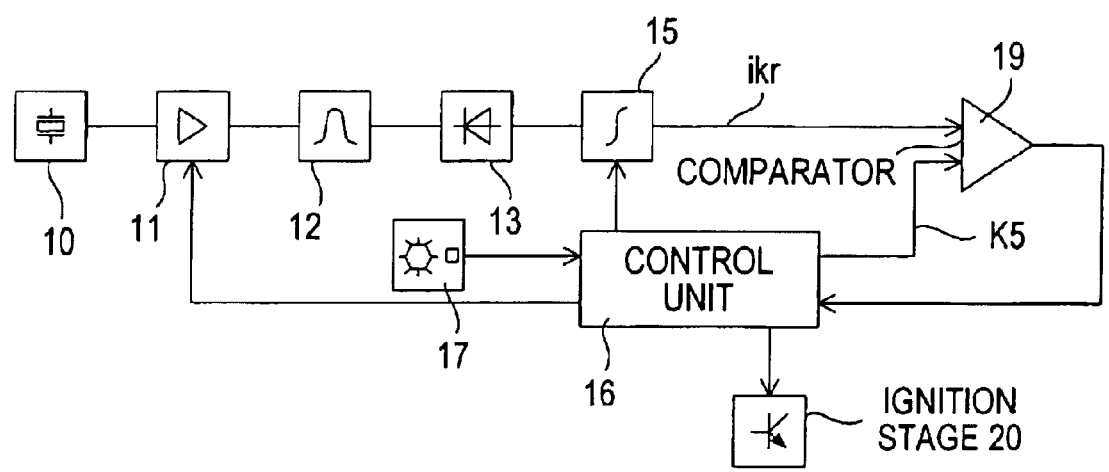
FIG. 3 is a circuit diagram for knock detection and/or control, which can be used to perform the method according to FIGS. 1 and 2 and which is already known and described in German Patent Document DE-OS 43 339 65 and/or U.S. Pat. No. 5,743,233.

In FIG. 3 an embodiment of an apparatus for knock detection and/or knock control in an internal combustion engine is illustrated, which can perform the method according to the invention. The apparatus comprises a knock sensor 10, which detects the noise or sounds of an unshown engine and/or internal combustion engine. The detected knock sensor signals are fed to an amplifier 11 and then the amplified signals are fed through a band pass filter 12 and a demodulation circuit 13 formed as a rectifier. The rectifier is connected with an integrator 15. The amplifier is controlled so that the reference level of the output signal of the amplifier is kept constant and independent of the motor rotation speed. The integrator 15 integrates the measured signal ikr during a crankshaft-synchronized measurement window, which is formed by a control unit 16 according to the rotation speed signal from the rotation speed sensor 17. The measured integral ikr is compared in a comparator 19 with the knock threshold ks supplied by the control unit. The output signal of the comparator is the knock detection signal, which is fed to the control unit 16 for knock control. The control unit 16 generates output signals for the end stage 20 according to the output of the comparator 19, i.e. for control of the ignition in the concerned cylinder, according to whether or not knock is occurring.

The additional steps of the method described in connection with FIGS. 1 and 2 usually run in the control unit 16 of the internal combustion engine and/or motor, which comprises a suitable processor and memory unit.

While the invention has been illustrated and described as embodied in German Patent Application 100 42 498.3 filed on Sep. 1, 2000 in Germany, it is not intended to be limited to the details shown, since various modifications and changes may be made without departing in any way from the spirit of the present invention.

While the invention has been illustrated and described as embodied in a method for detecting knock in an internal combustion engine, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method for detecting knock in an internal combustion engine with multiple cylinders, comprising the following steps:
   detecting knock in a selected one of the multiple cylinders when a detected and produced knock signal of the selected cylinder exceeds a reference level, wherein the reference level changes as a function of a sound level of the internal combustion engine, wherein an increase of the reference level is limited in consideration of a sound level of another one of the multiple cylinders or a sound level of all cylinders.

2. The method for detecting knock according to claim 1, wherein limiting of the increase of the reference level takes place in consideration of a gradient, wherein said gradient is a measure of the change of the reference level.

3. The method for detecting knock according to claim 1, wherein the increase of the reference level is limited when a cylinder-specific determined new reference level lies outside of a reference level range, wherein said reference level range is formed depending on the sound level of a single cylinder or all cylinders.

4. The method for detecting knock according to claim 1, wherein the increase of the reference level is defined when a cylinder-specific, determined new reference level is greater than a predetermined value and said predetermined value is derived from a part of said sound level produced by a single cylinder or all cylinders.

5. The method for detecting knock according to claim 1, wherein the increase of the reference level is limited when a gradient of a sound increase is greater than a predeterminable value.

6. The method for detecting knock according to claim 1, wherein a band range for limiting the reference level increase is determined from an average of the reference level of a single cylinder or of all cylinders plus an applicable threshold.

7. The method for detecting knock according to claim 6, wherein a threshold for gradients is formed from an average value of gradients of a single cylinder or all cylinders plus an applicable further threshold.

8. The method for detecting knock according to claim 1, wherein said number of said cylinders does not consist of all cylinders but only those cylinders satisfying a predetermined cylinder selection criterion.

9. The method for detecting knock according to claim 8, wherein said predetermined cylinder selection criterion for each of said cylinders is based on a magnitude of a contribution to said sound level of the internal combustion engine from each of the cylinders.

10. The method for detecting knocks according to claim 8, wherein the cylinders are divided into groups, one of said groups including cylinders generating a greatest amount of sound and another said groups including cylinders generating a least amount of sound.

11. A device for detecting knock, comprising:
   at least one processor, wherein the device is a component of a control unit of an internal combustion engine, wherein the device performs the method as defined in claim 1.

* * * * *